United States Patent [19]
Jones

[11] Patent Number: 5,588,316
[45] Date of Patent: Dec. 31, 1996

[54] LOCKING DEVICE FOR SELECTIVELY PREVENTING ACCESS TO THE VALVE HANDLES OF A DOMESTIC WATER TAP

[76] Inventor: Steven Jones, 96, Domaine Montaubois, R.R. 1, Mont Rolland, J0R 1G0, Canada

[21] Appl. No.: 422,086

[22] Filed: Apr. 4, 1995

[51] Int. Cl.⁶ ............................................. F16K 35/10
[52] U.S. Cl. ................ 70/178; 70/163; 70/166; 70/199; 70/209; 70/DIG. 58; 137/382
[58] Field of Search .......................... 70/158, 163, 164, 70/166–173, DIG. 58, 175–180, 207, 198–200, 209, 232, 211, 212, 229; 137/382, 377, 801

[56] References Cited

U.S. PATENT DOCUMENTS

| | | | |
|---|---|---|---|
| 1,333,309 | 3/1920 | Hause | 70/178 |
| 2,479,300 | 8/1949 | Binz | 70/232 |
| 2,912,847 | 11/1959 | Putman et al. | 70/232 |
| 2,957,587 | 10/1960 | Tobin | 70/DIG. 58 X |
| 3,199,121 | 8/1965 | Greto | 137/382 |
| 3,410,122 | 11/1968 | Moses | 70/232 |
| 5,193,574 | 3/1993 | Lopez | 137/382 |
| 5,375,916 | 12/1994 | Cook | 70/DIG. 58 X |
| 5,469,724 | 11/1995 | Pollard | 70/178 |

FOREIGN PATENT DOCUMENTS

| | | | |
|---|---|---|---|
| 230529 | 3/1925 | United Kingdom | 137/377 |

Primary Examiner—Lloyd A. Gall

[57] ABSTRACT

A locking device for selectively preventing access to the valve handles of a domestic water tap. The locking device is adapted to prevent a child from playing with the hot water tap handle and potentially getting burned by the hot water emanating from the hot water tap. The locking device has a pair of handle enclosing components which are adapted to enclose the tap handles and prevent access to the latter. Each handle enclosing component has a substantially concave-shaped wall defining a substantially hollow body. Each substantially concave-shaped wall has a corresponding peripheral edge defining a lateral aperture. The handle enclosing components are linked together by a pair of connecting rods extending from the respective peripheral edges of the handle enclosing component. Both connecting rods are attached to a locking block positioned intermediate the handle enclosing components. The locking block slidably receives the connecting rods and allows the handle enclosing components to be locked in a predetermined spaced relationship relatively to one another. The user is thus adapted to initially position the handle enclosing components on each side of the tap handles and then to slide the handle enclosing components over the tap handles. Once the tap handles are enclosed inside the handle enclosing components, the user prevents the handle enclosing components from being laterally withdrawn from the tap handles by using the locking block.

5 Claims, 1 Drawing Sheet

LOCKING DEVICE FOR SELECTIVELY PREVENTING ACCESS TO THE VALVE HANDLES OF A DOMESTIC WATER TAP

BACKGROUND

1. Field of the Invention

The present invention relates to the field of safety locking devices and is particularly concerned with a locking device for selectively preventing access to the valve handles of a conventional household water tap.

2. Prior Art

Every year, an increasingly large number of children suffer from relatively severe skin burns caused by hot water emanating from conventional household water taps such as the bathtub tap or the kitchen sink tap.

Indeed, children left unattended in a bathtub or adjacent a sink, even for a short period of time, will often have a propensity to play with the valve handles of the water taps.

Since the water temperature inside a conventional domestic hot water heater can reach values of up to 140 degrees Farenheight, if the hot water valve is accidentally opened, the water flowing out of the nozzle is susceptible of burning the tender skin of a child.

Furthermore, since an increasingly large segment of the population reaches an age at which Alzeimer's disease and other types of mentally impairing diseases become frequent, this increasingly large segment of the population also becomes susceptible of sustaining relatively severe skin burns as a result of inadvertently opening a domestic hot water valve.

SUMMARY OF THE INVENTION

Accordingly, it is an object of the present invention to provide a safety locking device which will allow the user to selectively prevent access to the valve handles of a domestic water tap.

The safety locking device in accordance with the present invention will thus prevent a child or an adult having reduced or impaired mental capacities from sustaining skin burns caused by the inadvertent opening of a conventional domestic hot water tap.

The safety locking device in accordance with the present invention will be readily installable over conventional valve handles.

The safety locking device in accordance with the present invention will be ergonomical to use.

The safety locking device in accordance with the present invention will conform to conventional forms of manufacturing in order to be economically feasible.

According to one embodiment of the present invention, there is provided a locking device for selectively preventing access to the valve handles of a domestic water tap, said locking device comprising: a pair of substantially hollow handle enclosing components, each one of said handle enclosing components having a substantially concave-shaped wall, each one of said substantially concave-shaped walls defining a peripheral edge, each one of said peripheral edges defining an aperture, said handle enclosing components being positioned so that said apertures face one another, each one of said substantially hollow handle enclosing components being configured and sized in order to receive one of said valve handles, a pair of substantially rigid connecting rods, each one of said substantially rigid connecting rods extending substantially outwardly from one of said peripheral edges, a locking means for releasably locking said substantially rigid connecting rods together.

Preferably, each one of said substantially hollow handle enclosing components has a substantially curved section and a substantially flat section, each one of said substantially curved sections having substantially the shape of a dome truncated in half.

Conveniently, said substantially curved section is a grid formed by meshed wires.

Preferably, said substantially flat section is made of a relatively thin sheet of substantially rigid material and wherein each one of said substantially flat section comprises a substantially elongated fixing slot extending from said peripheral edge.

Conveniently, said locking means comprises a locking block, a pair of locking block rod receiving apertures extending through said locking block, each one of said locking block rod receiving aperture being adapted to slidably receive one of said connecting rod, a pair of locking key receiving apertures extending through said locking block, said locking key receiving apertures extending substantially perpendicularly to said locking block rod receiving apertures and intercepting the latter, a pair of locking keys, each one of said locking keys being threadably inserted into one of said locking key receiving apertures, said locking keys being adapted to frictionally abut against said connecting rods for releasably locking said connecting rods inside said locking block rod receiving apertures.

BRIEF DESCRIPTION OF THE DRAWINGS

An embodiment of the present invention will now be described, by way of example, in reference to the following drawings in which.

DETAILED DESCRIPTION

Figure 1:
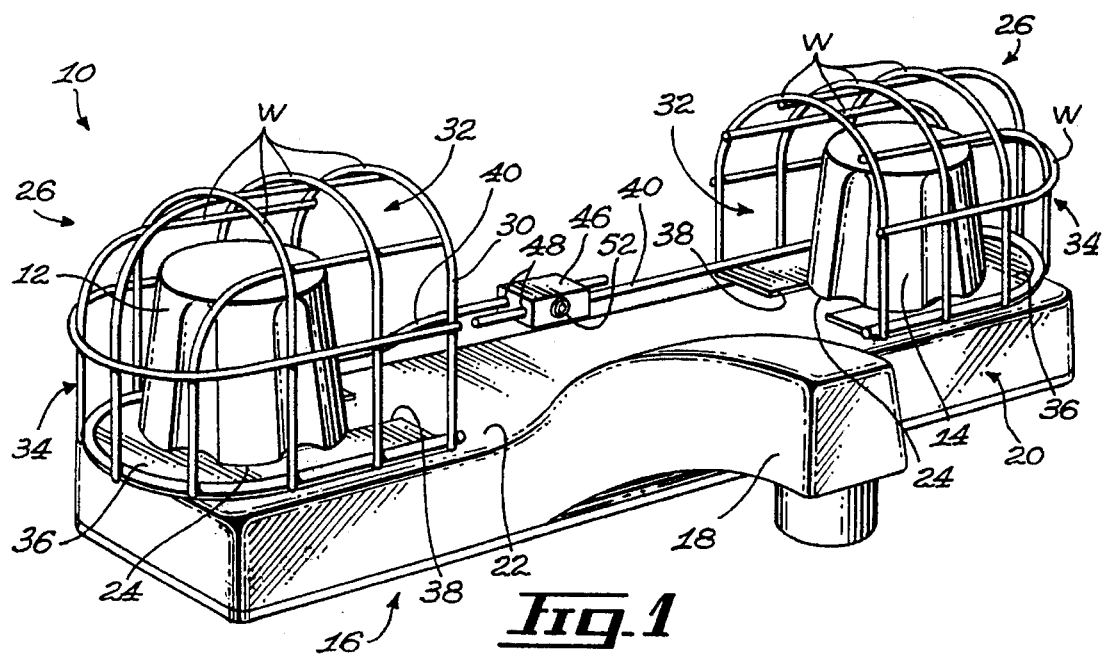
FIG. 1: in a perspective view, illustrates a safety locking device in accordance with an embodiment of the present invention mounted over a pair of conventional household water tap valve handles.
Figure 2:
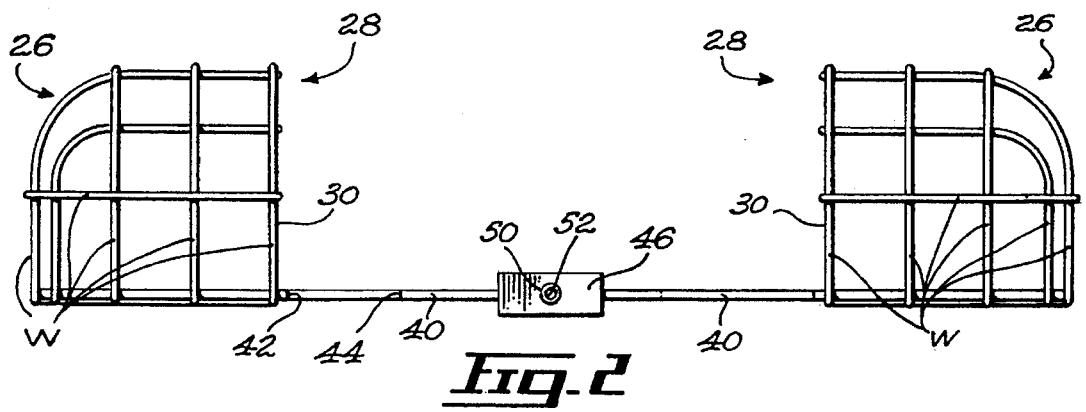
FIG. 2: in an elevational view, illustrates a safety locking device in accordance with an embodiment of the present invention.
Figure 3:
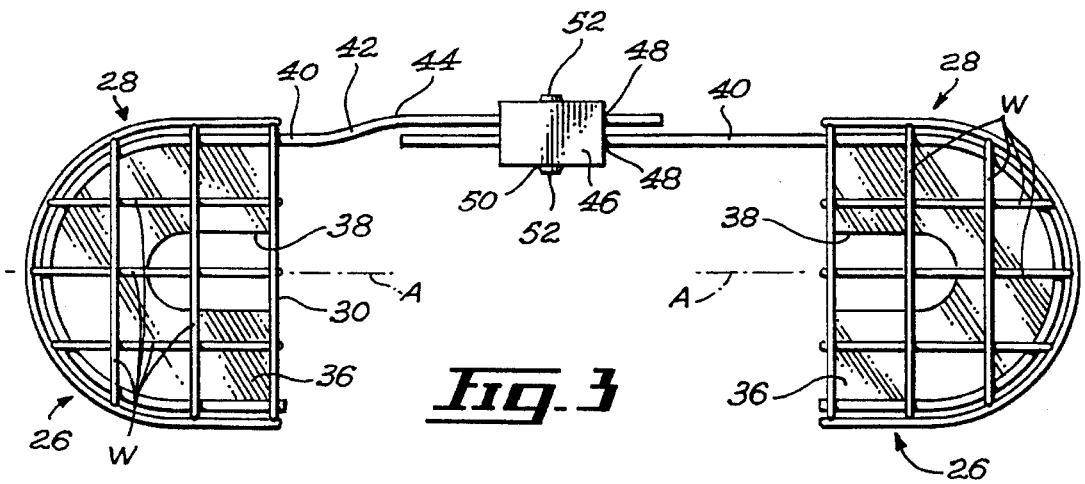
FIG. 3: in a top view, illustrates a safety locking device in accordance with an embodiment of the present invention.

Referring to FIG. 1, there is shown a locking device 10 in accordance with an embodiment of the present invention. The locking device 10 is shown mounted over a hot water tap handle 12 and a cold water tap handle 14. The hot water tap handle 12 and the cold water tap handle 14 are part of a conventional tap arrangement 16. The hot water tap handle 12 and the cold water tap handle 14 are each mechanically coupled to a valve system (not shown) by a corresponding coupling shaft (not shown). The valve system is adapted to control the flow of water through a dispensing nozzle 18.

In FIG. 1, the hot water tap handle 12 and the cold water tap handle 14 are shown rotatably mounted over a tap base 20. The tap base 20 has a substantially block-shaped configuration defining a substantially flat base top surface 22. Although the locking device 10 is shown mounted over a tap arrangement 16, it is to be understood that the locking device 10 in accordance with the present invention could be used with any suitable water tap or a flow control means of any suitable type without departing from the scope of the present invention.

The hot water tap handle 12 and the cold water tap handle 14 each have a rearward most peripheral edge 24. The rearwardmost peripheral edges 24 are located substantially adjacent the top surface 22.

The locking device 10 has a pair of handle enclosing components 26. Each handle enclosing component 26 has a substantially concave-shaped wall 28 defining a substantially hollow body. Each substantially concave-shaped wall 28 has a corresponding peripheral edge 30. Each peripheral edge 30 defines an aperture 32. Each aperture 32 leads into a corresponding substantially hollow body formed by a corresponding concave-shaped wall 28.

Each substantially concave-shaped wall 28 is configured and sized in order to receive and protectively enclose a corresponding hot water tap handle 12 or a cold water tap handle 14.

In the preferred embodiment, each substantially concave-shaped wall 28 has a substantially curved section 34 and a substantially flat section 36. The substantially curved sections 34 substantially have the shape of a dome. The substantially curved sections 34 are preferably made of a grid. The grid is preferably formed by metallic wires indicated by the reference letter W welded together and coated with a polymeric resin. The use of a grid prevents the trapping of water inside the substantially hollow bodies.

The substantially flat sections 36 are preferably made of a relatively thin sheet of substantially rigid material. The substantially flat sections 36 are adapted to be in a geometrical plane substantially parallel to the substantially flat base top surface 22.

Each substantially flat section 36 is provided with a substantially elongated fixing slot 38 extending from its peripheral edge 30. Each fixing slot 38 extends along a longitudinal axis A—A thereof.

A connecting rod 40 extends outwardly and substantially perpendicularly from each peripheral edge 30. In the preferred embodiment, the connecting rods 40 extend integrally from one of the wires W forming the grid of the corresponding substantially curved sections 34 of the substantially concave-shaped wall 28. The connecting rods 40 typically extend from a wire W located adjacent the substantially flat section 36. One of the connecting rods 40 is relatively straight while the other connecting rod 40 is slightly bended about a pair of inflection locations 42 and 44. When the device 10 is in an operable configuration, the handle enclosing components 26 are adapted to be positioned with their respective apertures 32 in face to face relationship relatively to one another. When the device 10 is in an operable configuration, the handle enclosing components 26 are also adapted to be positioned with their respective substantially flat sections 36 in a substantially coplanar relationship relatively to one another. When the device 10 is in an operable configuration, the connecting rods 40 are adapted to be positioned in an adjacent relationship with one another.

A locking means is adapted to lock the handle enclosing components 26 in a predetermined operable configuration spaced relationship relatively to one another.

In the preferred embodiment, the locking means is a locking block 46. The locking block 46 has a pair of locking block rod receiving apertures 48 extending therethrough. Each locking block rod receiving aperture 48 is adapted to slidably receive a corresponding connecting rod 40.

The locking block 46 also has a pair of locking key receiving apertures 50. Each locking key receiving aperture 50 extends into the locking block 46 substantially perpendicularly to a corresponding rod receiving aperture 48, intercepting the latter. Each locking key receiving aperture 50 is provided with a set of surface threads. Each locking key receiving aperture 50 is adapted to receive a locking key 52. In the preferred embodiment, the locking key 52 is a conventional Allen-type of key.

The locking key 52 is adapted to frictionally abut against a corresponding connecting rod 40 for releasably locking the enclosing components 26 in a predetermined spaced relationship relatively to one another.

In use, in order to install the handle enclosing components 26 over the hot water tap handle 12 and the cold water tap handle 14, the user first loosens the locking key 52 in order to allow the connecting rods 40 to translate inside the rod receiving apertures 48. The handle enclosing components 26 are then pulled apart from one another so as to clear laterally the hot water tap handle 12 and the cold water tap handle 14. The handle enclosing components 26 are then pulled towards one another until the hot water tap handle 12 and the cold water tap handle 14 are each inserted inside a substantially hollow body formed by a corresponding concave-shaped wall 28 of a corresponding handle enclosing component 26.

When the handle enclosing components 26 are positioned laterally on each side of the hot water tap handle 12 and the cold water tap handle 14, the substantially flat sections 36 are abuttingly rested against the flat base top surface 22. When the handle o enclosing components 26 are pulled towards one another, the substantially flat sections 36 slide on the flat top surface 22 with the substantially elongated fixing slots 38 slidably receiving the valve system coupling shafts of the corresponding hot water tap handle 12 and the cold water tap handle 14. The substantially flat configuration of the substantially flat sections 36 allows them to slide underneath the rearwardmost peripheral edges 24 of the hot water tap handle 12 and the cold water tap handle 14. Once the hot water tap handle 12 and the cold water tap handle 14 are inserted inside the handle enclosing components 26, the user then releasably prevents the handle enclosing components from displacement relative to one another by frictionally engaging the locking keys 52 against the connecting rods 40.

The embodiments of the invention in which an exclusive privilege or property is claimed are defined as follows:

1. A locking device for selectively preventing access to the valve handles of a domestic water tap, said locking device comprising:

a pair of substantially hollow handle enclosing components, each one of said handle enclosing components having a substantially concave-shaped wall, each one of said substantially concave-shaped walls defining a peripheral edge, each one of said peripheral edges defining an aperture, said handle enclosing components being positioned so that said apertures face one another, each one of said substantially hollow handle enclosing components being configured and sized in order to receive one of said valve handles, a pair of substantially rigid connecting rods, each one of said substantially rigid connecting rods extending substantially outwardly from one of said peripheral edges, a locking means for releasably locking said substantially rigid connecting rods together.

2. A locking device as recited in claim 1 wherein each one of said substantially hollow handle enclosing components has a substantially curved section and a substantially flat section, each one of said substantially curved sections having substantially the shape of a dome.

3. A locking device for selectively preventing access to the valve handles of a domestic water tap, said locking device comprising:
- a pair of substantially hollow handle enclosing components, each one of said handle enclosing components having a substantially concave-shaped wall, each one of said substantially concave-shaped walls defining a peripheral edge, each one of said peripheral edges defining an aperture, said handle enclosing components being positioned so that said apertures face one another, each one of said substantially hollow handle enclosing components being configured and sized in order to receive one of said valve handles,
- a pair of substantially rigid connecting rods, each one of said substantially rigid connecting rods extending substantially outwardly from one of said peripheral edges,
- a locking means for releasably locking said substantially rigid connecting rods together;
- each one of said substantially hollow handle enclosing components having a substantially curved section and a substantially flat section, each one of said substantially curved sections having substantially the shape of a dome;
- each said substantially curved section being a grid formed by meshed wires.

4. A locking device as recited in claim 3 wherein each said substantially flat section is made of a relatively thin sheet of substantially rigid material and wherein each said substantially flat section comprises a substantially elongated fixing slot extending from said peripheral edge.

5. A locking device for selectively preventing access to the valve handles of a domestic water tap, said locking device comprising:
- a pair of substantially hollow handle enclosing components, each one of said handle enclosing components having a substantially concave-shaped wall, each one of said substantially concave-shaped walls defining a peripheral edge, each one of said peripheral edges defining an aperture, said handle enclosing components being positioned so that said apertures face one another, each one of said substantially hollow handle enclosing components being configured and sized in order to receive one of said valve handles,
- a pair of substantially rigid connecting rods, each one of said substantially rigid connecting rods extending substantially outwardly from one of said peripheral edges,
- a locking means for releasably locking said substantially rigid connecting rods together; said locking means comprising
- a locking block,
- a pair of locking block rod receiving apertures extending through said locking block, each one of said locking block rod receiving apertures being adapted to slidably receive one of said connecting rods,
- a pair of locking key receiving apertures extending into said locking block, said locking key receiving apertures extending substantially perpendicularly to said locking block rod receiving apertures and intercepting the latter.
- a pair of locking keys, each one of said locking keys being threadably inserted into one of said locking key receiving apertures,
- said locking keys being adapted to frictionally abut against said connecting rods for releasably locking said connecting rods inside said locking block rod receiving apertures.

* * * * *